B. F. STURTEVANT.
GRAIN DRIER.

No. 100,212. Patented Feb. 22, 1870.

B. F. Sturtevant

Witnesses:
W. B. Crosby
Francis Gould

United States Patent Office.

B. F. STURTEVANT, OF JAMAICA PLAIN, MASSACHUSETTS.

Letters Patent No. 100,212, dated February 22, 1870.

GRAIN-DRIER.

The Schedule referred to in these Letters Patent and making part of the same.

*To all whom it may concern:*

Be it known that I, B. F. STURTEVANT, of Jamaica Plain, in the county of Norfolk, and State of Massachusetts, have invented Improvements in Apparatus for Drying Grain and other granular matter; and I do hereby declare that the following, taken in connection with the drawings which accompany and form part of this specification, is a description of my invention sufficient to enable those skilled in the art to practice it.

This apparatus, which is primarily intended for drying grain, to season it or make it part with its natural moisture to prevent it from sweating in bulk, or to free it from water absorbed in transportation or in cases of partial or entire wreck, is also applicable to other uses, such as drying malt for brewers' use, drying tan for fuel, &c.

Drying granular substances has heretofore been effected by spreading them in comparatively thin layers over heated surfaces; also, by allowing them to gravitate in tortuous or zigzag directions through space which has passing through it a current of heated air; and it has been attempted to dry grain in large masses by forcing through them currents of air, but owing to the compactness of such masses this has only been effected at great expense of power, and in an irregular manner, the grain not being equally dried throughout all parts of the mass.

By experiment, I have found that air cannot be forced with any reasonable expenditure of power through considerable distances in masses of grain, and my invention has for its object the overcoming of this difficulty, as by my invention I dry granular substances in bulk by forcing through the grain hot or cold air or gases, but in my invention I so arrange that throughout the mass of granular material the aeriform particles have to move but short distances among the grains or granules before they find a free outlet.

In my invention I also, by preference, arrange my apparatus so that the entrance and delivery of the granular matter thereunto and therefrom proceeds with regularity, so that the whole mass under treatment is made to move, the grains constantly changing their positions, and thus the uniform drying of the whole is thoroughly accomplished.

My invention consists in a bin or apartment in which are located, at comparatively small distances apart, two series of pipes or tubes, made of wire cloth, through one of which series air or gases are forced into the granular matter in the bin and surrounding the pipes, which air or gases escape into the pipes of the other series, each series having preferably a chamber common to all the pipes of the series, the chamber of the outlet-pipes being preferably connected to an exhausting device, while the chamber of the inlet-pipes is connected with a device for forcing air or gases.

My invention also consists in a pipe or tube made of wire, which is woven and then coated with zinc or other suitable metal, which serves both to protect the wire from oxidation and to unite or solder the wires together at their crossings; and My invention further consists in certain other arrangements and combinations of devices by which the operation of the main features of my improved drier are facilitated.

In the drawings—

Figure 1:
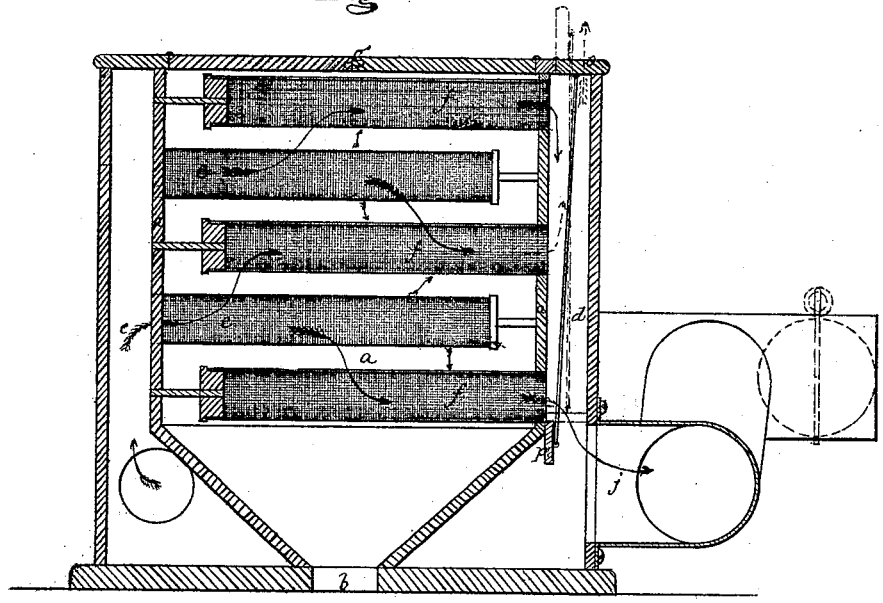
Figure 1 shows my improved drying apparatus in vertical section.

The bin or apartment for reception of granular matter is denoted by $a$, the bottom of the chamber being preferably made in the form of a hopper, with one or more outlets at $b$, which can be controlled by valves or slides to regulate the escape of the granular matter from the bin or chamber.

At opposite ends of said bin or chamber $a$ are inlet and outlet chambers $c$ and $d$. With the chamber $c$ a series of inlet-pipes, $e$, communicates, the pipes being suitably supported in chamber $a$, so that they will not sag or break under the weight imposed upon them.

In the drawings the pipes are shown as supported only at each end, but in practice the pipes may rest on supports resting on the bottom of chamber $a$ or hung from its top.

The outlet-pipes $f$ are supported similarly to pipes $e$, and communicate with the chamber $d$.

The top $g$ of chamber $a$ is removably fixed to the chamber so as to keep it tight at the top, except when it is necessary to enter the chamber $a$ for cleansing or repairs. In the top a suitable aperture or apertures are made for the entrance of granular matter, which apertures should be of such size in proportion to the inflowing currents of material that they will be kept filled thereby, so that the bulk of the air or gases entering and escaping from chamber $a$ will have to pass off through the outlet-pipes $f$.

The chamber $c$ is closed except where the entrance-pipe $h$ and the pipes $e$ connect with said chamber, and the chamber $d$ is also closed, with exception of the openings for pipes $f$ and the outlet-pipe $j$.

The chamber $c$ may be connected with any suitable apparatus arranged to force into said chamber hot or cold air, or gases. The apparatus shown in the drawings for that purpose is a rotary blower, $k$, which has its suction-inlet connected with a tubular heater, $l$, the tubes $m$ of which connect with the outlet-pipe $j$ from the chamber $a$, said pipes being surrounded by a jacket, $n$, into which, and around pipes $m$, steam or the hot volatile products of combustion may be introduced to heat the currents of air drawn from bin $a$.

Figure 2:
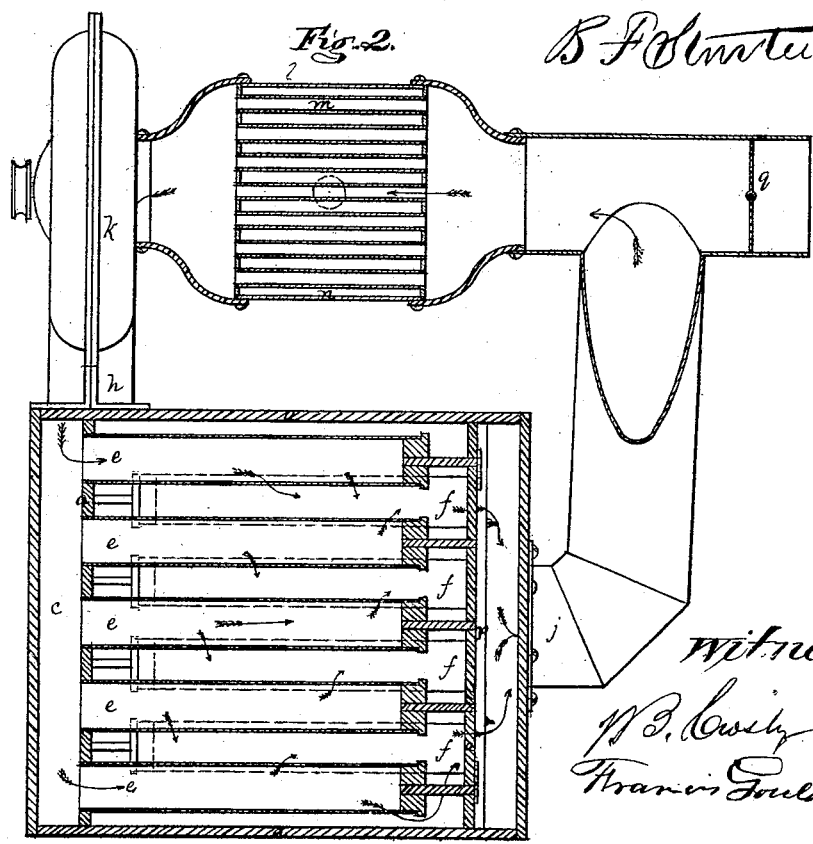
Figure 2 shows the same in horizontal section.

Chamber $d$ is provided with a hinged cover, $o$, which is connected with a hinged valve, $p$, located in said chamber between the lowest of the series of pipes *f*, and above the outlet-pipe *j*, so that when cover *o* is closed valve *p* is open, and when cover *o* is raised, as seen in dotted lines, fig. 1, valve *p* is closed, as also seen in dotted lines, so that then the chamber *d* discharges into the air instead of through discharge-pipe *j*, in which case valve *q*, seen closed in fig. 2, is opened, as seen in fig. 1, to supply air to the blower to be forced into the grain-chamber.

The operation of my improved apparatus is as follows:

Suppose the chamber *a* filled with grain, the cover *o* closed, and valve *q* closed. Then, when the blower *k* is set in motion air will be drawn from pipes *f*, and the interstices of the grain adjacent to the said pipes, and will flow down through chamber *d*, through pipe *j* and tubes *m*, (where it will be heated, if steam or other hot matter is made to pass through case *n*,) into the blower, which will force it out through pipe *h* into chamber *c* and tubes *e*, from which it will pass through the adjacent grain in the shortest distances to pipes *f*, thus completing one circuit and commencing another. The directions of the air-currents thus described are indicated by the arrows marked on the drawings.

When, after having made more or less circuits through the grain, the heated air has become charged with moisture, the valve *q* is opened and cover *o* is raised, closing valve *p*, so that the moist warm air is discharged in the direction of the dotted arrows shown in fig. 1. When the moist air is discharged, then valve *q*, which admitted dry air, is closed, and cover *o* is closed, opening valve *p*, and the circuit of air goes on, as before described.

When the body of grain is sufficiently dried, then the inlet and outlet-valves for the grain are adjusted so as to maintain such a flow of grain through the apparatus as will receive moist or damp grain at the top of bin *a*, and discharge it dry or cured at the bottom.

For drying some substances, the volatile products of combustion may be used. A common hot-air furnace may be used instead of the tubular heater shown, to heat the air made to pass through the grain.

When comparatively dry grain is being treated in my apparatus, the renewals of the heated air which has absorbed moisture from the granular matter by supplies of cool dry air to be heated, will, of course, be much less frequent than when treating matter heavily charged with moisture.

When the apparatus is worked without employment of heat, then the top of chamber *d* and the suction-inlet of the blower should be left freely open.

The arrangement of the pipes of both series may be made vertical or inclined, but I prefer the horizontal arrangement shown, and the shape of the pipes may be other than cylindrical if desired.

I claim—

In combination with a bin or chamber for reception of grain or granular matter, the series of wire cloth, inlet and outlet-pipes or conduits connected with an air-moving apparatus for causing passage of air or aeriform fluids through said matter, for the purpose described.

Also, a lap-jointed pipe of wire cloth, coated with metal, so that the crossings of the wire and the parts of the joints are soldered by the coating.

Also, the combination in a grain-bin of the chamber *c* and series of wire-cloth pipes *e*, with the series of wire-cloth pipes *f* and chamber *d*.

Also, the combination of a blower and heater with a grain-bin, provided with an air-supplying and distributing apparatus, so connected with the blower as to move air repeatedly through the contents of the grain-bin.

Also, the combination, with the apparatus last claimed, of an adjustable air-inlet for admitting fresh air to be mingled with the repeatedly-circulated air, to supply the place of air allowed to pass off from the grain-bin, or escaping therefrom in leakage.

B. F. STURTEVANT.

Witnesses:
   J. B. CROSBY,
   FRANCIS GOULD.